United States Patent
Song et al.

(10) Patent No.: US 10,522,301 B2
(45) Date of Patent: Dec. 31, 2019

(54) HIGH POWER ENERGY STORAGE DEVICE ADDITIVE AND HIGH POWER ENERGY STORAGE DEVICE COMPRISING SAME

(71) Applicant: KOREA ELECTRONICS TECHNOLOGY INSTITUTE, Seongnam-si (KR)

(72) Inventors: Jun Ho Song, Seongnam-si (KR); Young Jun Kim, Seongnam-si (KR); Min Sik Park, Suwon-si (KR)

(73) Assignee: KOREA ELECTRONICS TECHNOLOGY INSTITUTE (KP)

( * ) Notice: Subject to any disclaimer, the term of this patent is extended or adjusted under 35 U.S.C. 154(b) by 0 days.

(21) Appl. No.: 15/740,895

(22) PCT Filed: May 4, 2016

(86) PCT No.: PCT/KR2016/004739
§ 371 (c)(1),
(2) Date: Dec. 29, 2017

(87) PCT Pub. No.: WO2017/003083
PCT Pub. Date: Jan. 5, 2017

(65) Prior Publication Data
US 2018/0197691 A1 Jul. 12, 2018

(30) Foreign Application Priority Data

Jun. 30, 2015 (KR) .......................... 10-2015-0093587

(51) Int. Cl.
*H01G 11/06* (2013.01)
*H01G 11/50* (2013.01)
(Continued)

(52) U.S. Cl.
CPC ............. *H01G 11/50* (2013.01); *C01D 15/00* (2013.01); *C01G 51/00* (2013.01); *C01G 51/42* (2013.01);
(Continued)

(58) Field of Classification Search
CPC ....... H01G 11/50; H01G 11/06; H01M 4/525; H01M 3/364
(Continued)

(56) References Cited

FOREIGN PATENT DOCUMENTS

KR 10-1383360 B1 4/2014

OTHER PUBLICATIONS

Lim et al., Journal of Materials Chemistry A., May 5, 2015 (Published online), vol. 3, No. 23, pp. 12377-12385.
(Continued)

*Primary Examiner* — Eric W Thomas
*Assistant Examiner* — Arun Ramaswamy
(74) *Attorney, Agent, or Firm* — Dilworth IP, LLC

(57) ABSTRACT

The present invention relates to a high power energy storage device additive and a lithium ion capacitor including the same, and more particularly, to: a preparation method of a new lithium ion capacitor additive which is added to a carbon-based material applied as a cathode active material of a lithium ion capacitor such that the new lithium ion capacitor additive is capable of improving capacity and energy density by electrochemically doping a lithium ion onto an anode; the lithium ion capacitor additive prepared thereby; and the lithium ion capacitor including the lithium ion capacitor additive.
The lithium ion capacitor additive according to the present invention can release 3 mols or more of lithium ions even at a low voltage of 4.4 V or less, and the lithium ion capacitor including the lithium ion capacitor additive according to the present invention can electrochemically dope lithium onto
(Continued)

the anode even without performing a pre-doping process using lithium metal as in the conventional lithium ion capacitor.

7 Claims, 7 Drawing Sheets

(51) Int. Cl.
    *H01M 4/525*     (2010.01)
    *H01M 4/36*     (2006.01)
    *C01G 51/00*     (2006.01)
    *C01D 15/00*     (2006.01)
    *H01G 11/46*     (2013.01)
    *H01G 11/32*     (2013.01)

(52) U.S. Cl.
    CPC .............. *H01G 11/06* (2013.01); *H01G 11/46* (2013.01); *C01P 2002/52* (2013.01); *C01P 2002/72* (2013.01); *C01P 2002/85* (2013.01); *C01P 2004/03* (2013.01); *C01P 2004/04* (2013.01); *C01P 2004/51* (2013.01); *C01P 2004/61* (2013.01); *C01P 2006/40* (2013.01); *H01G 11/32* (2013.01)

(58) Field of Classification Search
    USPC .......................... 361/502, 516, 532; 429/220
    See application file for complete search history.

(56) References Cited

OTHER PUBLICATIONS

Johnson et al., Chemistry of Materials, 2010, vol. 22, No. 3, pp. 1263-1270.
Noh et al., Journal of the Electrochemical Society, 2012, vol. 159, No. 8, pp. A1329-A1334.
Narukawa et al., Solid State Ionics, 1999, vol. 122, No. 1, pp. 59-64.
PCT International Search Report dated Aug. 18, 2016 from corresponding Application No. PCT/KR2016/004739, 6 pages.

| Title | Size (μm) |
|---|---|
| $d_{10}$ | 11.87 |
| $d_{30}$ | 23.10 |
| $d_{50}$ | 29.78 |
| $d_{70}$ | 36.77 |
| $d_{90}$ | 49.83 |

FIG. 6

[ Cross-sectional View ]

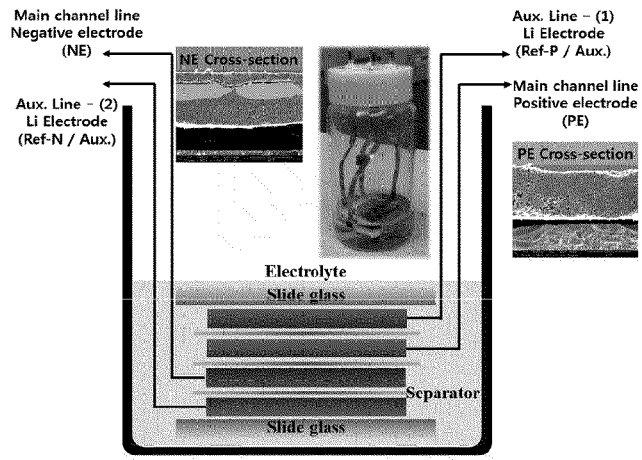

[ Top-View ]

Pre-doping
(Conventional)

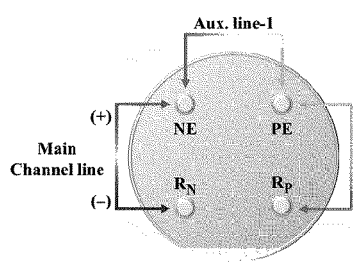

Main channel line: Pre-doping (half-cell configuration)
Aux. line-1: Read information of the full-cell voltage
Aux. line-2: Read information of the PE (vs. Li-$R_P$)

LIC evaluation

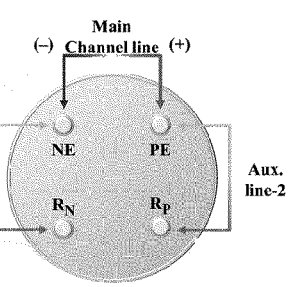

Main channel line: Evaluation (full-cell configuration)
Aux. line-1: Read information of the NE (vs. Li-$R_N$)
Aux. line-2: Read information of the PE (vs. Li-$R_P$)

Pre-doping & LIC evaluation
($Li_6CoO_4$)

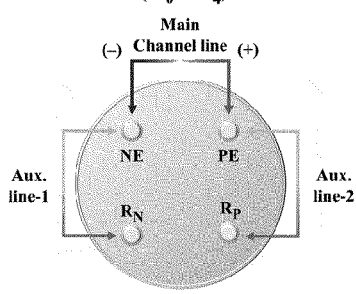

Main channel line: Evaluation (full-cell configuration)
Aux. line-1: Read information of the NE (vs. Li-$R_N$)
Aux. line-2: Read information of the PE (vs. Li-$R_P$)

HIGH POWER ENERGY STORAGE DEVICE ADDITIVE AND HIGH POWER ENERGY STORAGE DEVICE COMPRISING SAME

BACKGROUND OF THE INVENTION

Field of the Invention

The present invention relates to a high power energy storage device additive and a high power energy storage device comprising the same, and more particularly, to a new lithium ion capacitor additive which is added to a carbon-based material applied as a cathode active material for a lithium ion capacitor such that the new lithium ion capacitor additive is capable of improving capacity and energy density by electrochemically doping a lithium ion onto an anode, and the lithium ion capacitor comprising the lithium ion capacitor additive.

Related Art

With the spread of supply in portable small-sized electric and electronic devices, development of new-model secondary batteries such as a nickel hydrogen battery, a lithium secondary battery, a super capacitor, and a lithium ion capacitor is actively being progressed.

An electrochemical capacitor in an electrochemical energy storage device may be divided into an electric double layer capacitor using electric double layer principle and a hybrid super capacitor using electrochemical oxidation-reduction reaction.

An electric double layer capacitor using a physical adsorption reaction of electric charges in an electric double layer has been limited in the application to various application fields due to a low energy density despite excellent output characteristics and lifetime characteristics.

As a means of solving such a problem of the electric double layer capacitor, a lithium ion capacitor among hybrid super capacitors using a carbon-based material that is capable of inserting and extracting lithium ions as an anode active material has been suggested.

The lithium ion capacitor is a secondary battery system of a new concept which combines high power/long lifetime characteristics of an existing electric double layer capacitor (EDLC) with high energy density of a lithium ion battery.

In an electric double layer super capacitor using an activated carbon electrode in both electrodes, charging and discharging are achieved by a non-faradic reaction in which ions are physically adsorbed onto or desorbed from the surface of the electrode. On the other hand, in a lithium ion capacitor, a non-electrochemical reaction in which the ions are physically adsorbed or desorbed occurs in a cathode, and an electrochemical reaction in which lithium ions are electrochemically inserted into or extracted from a graphite layer structure occurs in an anode. Accordingly, the lithium ion capacitor is capable of obtaining a very larger electric capacity than the electric double layer super capacitor.

In order to stably realize high electric capacity characteristics of the lithium ion capacitor, a process of pre-doping a graphite anode with lithium is required. A high energy density can be obtained by pre-doping lithium onto the graphite anode, thereby maintaining an electric potential of the graphite anode at the same electric potential level as that of lithium metal during charging and discharging of the lithium ion capacitor. The lithium ion capacitor can sharply reduce the electric potential of the anode, can realize a high voltage of 3.8 V or higher that is greatly improved than a cell voltage of a conventional electric double layer capacitor of 2.5 V, and can implement a high energy density by pre-doping lithium ions with a high ionization tendency onto the anode.

A conventional method of pre-doping lithium onto the graphite anode adopts a method that metal lithium laminated by an electric potential difference between the anode and metal lithium is melted into the anode only by laminating metal lithium onto the electrode and injecting the metal lithium laminated onto the electrode into an electrolytic solution, thereby short circuiting the anode and metal lithium. That is, the graphite electrode is electrochemically doped with lithium in a state that the two electrodes are separated from each other after dipping the graphite electrode and a lithium metal electrode in the electrolyte.

However, when the electrochemical doping process is a lithium doping process of laminating metal lithium onto the electrode, it is difficult to control the amount of lithium doped onto the anode, it is hard to obtain safety according to lithium metal generated in the doping process, a very slow doping rate of lithium causes an increase in process costs, and the electrochemical doping process becomes a major impediment to universalization of the lithium ion capacitor accordingly.

SUMMARY OF THE INVENTION

To solve the above-mentioned lithium ion doping problems of a conventional lithium ion capacitor, the present invention provides a new lithium ion capacitor additive which is capable of electrochemically doping lithium onto the anode without performing a pre-doping process using metal lithium, and a preparation method of the lithium ion capacitor additive.

The present invention also provides a lithium ion capacitor comprising the lithium ion capacitor additive.

To achieve these objects of the present invention, the present invention provides a lithium ion capacitor additive represented by $Li_{6-x}Co_yM1_{1-y}O_{4-z}A_z$.

In chemical formula, $0 \leq x \leq 4$, $0 \leq y \leq 1$ and $0 \leq z \leq 1$, M1 is any one selected from the group consisting of Ni, Mn and Fe, and A is any one selected from the group consisting of F, Cl and Br.

The lithium ion capacitor additive according to the present invention is a particle type, has a particle size of 10 to 50 μm, and is formed in an anti-fluorite structure.

Furthermore, the present invention provides a cathode active material for a lithium ion capacitor, the cathode active material comprising the lithium ion capacitor additive according to the present invention and a carbon-based material.

In the present invention, the lithium ion capacitor additive in the cathode active material is characterized in that energy at which a peak intensity caused by a cobalt (Co) atom in X-ray photoelectron spectroscopy (XPS) becomes a maximum is exhibited at 779.8 eV, corresponding to $Co^{2+}$ when x is 0.

In the present invention, the lithium ion capacitor additive in the cathode active material is characterized in that the energy at which the peak intensity caused by a cobalt (Co) atom in the XPS becomes the maximum is 780.4 eV, corresponding to $Co^{3+}$ when x is more than 0 and less than 1.

In the present invention, the lithium ion capacitor additive in the cathode active material is characterized in that the energy at which the peak intensity caused by a cobalt (Co)

atom in the XPS becomes the maximum is 781.4 eV, corresponding to $Co^{4+}$ when x is more than 1 and less than 2.

In the present invention, the lithium ion capacitor additive in the cathode active material is characterized in that although there is not a change in the location of energy at which a peak intensity caused by an oxygen (O) atom in the XPS becomes a maximum according as x increases when x is 2 or less, the location of energy at which a peak intensity caused by an oxygen (O) atom in the XPS becomes the maximum according as x increases is moved from 529.3 eV to 529.8 eV when x is 2 or more.

In the present invention, the cathode active material has an initial charge-discharge efficiency (QE) according to the following calculation formula 1 of 50% or less:

15 $QE=(QD/QC)\times 100$ [Calculation formula 1]

In calculation formula 1,

QE denotes an initial charge-discharge efficiency of lithium composite metal oxide, QD denotes a discharge capacity (mAh/g) with a cut-off discharge voltage of 2.3V vs. $Li/Li^+$, and 20 QC denotes a charge capacity (mAh/g) with a cut-off charge voltage of 4.7V vs. $Li/Li^+$ In the present invention, the carbon-based material is one or more selected from the group consisting of activated carbon, an activated carbon-metal oxide composite, and an activated carbon-conductive polymer composite.

The lithium ion capacitor additive is mixed at a ratio of 10 to 20 parts by weight with the respect to 100 parts by weight of the carbon-based material.

Further, the present invention provides a lithium ion capacitor comprising: a cathode including a cathode active material according to the present invention;

an anode including an anode active material; and a separator between the cathode and the anode, wherein the anode receives lithium ions only from the cathode.

In the lithium ion capacitor according to the present invention, the anode is pre-doped with lithium in an amount corresponding to 60 to 100% of anode capacity.

BRIEF DESCRIPTION OF THE DRAWINGS

FIG. 6 shows structure of a lithium ion capacitor manufactured in the Example of the present invention.

DESCRIPTION OF EXEMPLARY EMBODIMENTS

Hereinafter, the present invention will be described in more detail. However, the present invention is not limited by the following Example.

EXAMPLE

Preparation of $Li_{6-x}CoO_4$

After mixing $Li_2O$ and CoO as raw materials at a molar ratio of 3:1, a powder was obtained by mechanically milling, thereby pulverizing the mixture for 12 hours. The mixture was heated at 700° C. for 12 hours under an Ar atmosphere. To prevent contact with moisture, the collected powder was handled in a sealed dry room.

EXPERIMENTAL EXAMPLE

Measurement of FESEM

Figure 1:
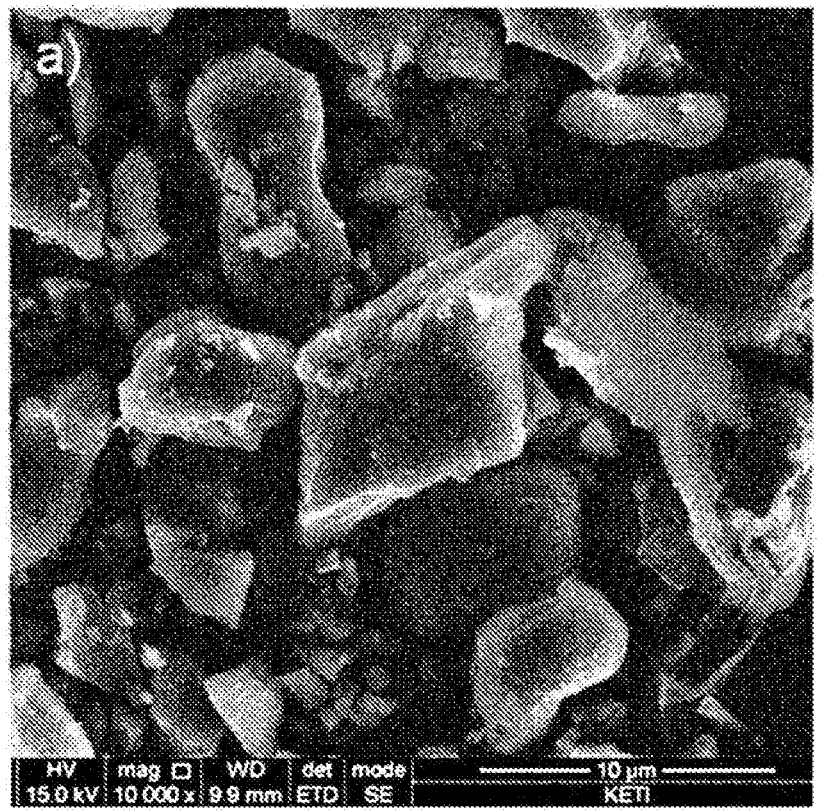
FIG. 1 and FIG. 2 show a result of measuring a field emission scanning electron microscope (FESEM) photograph with respect to a $Li_{6-x}CoO_4$ powder prepared in the Example of the present invention, and a result of measuring a distribution chart of particle sizes of the $Li_{6-x}CoO_4$ powder.
Figure 2:
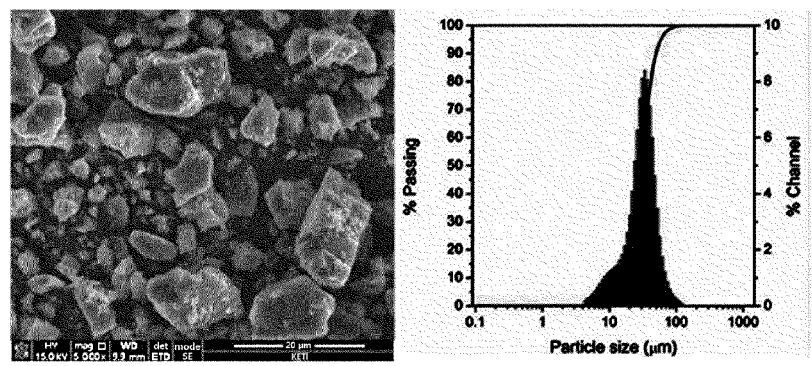
Figure 3:
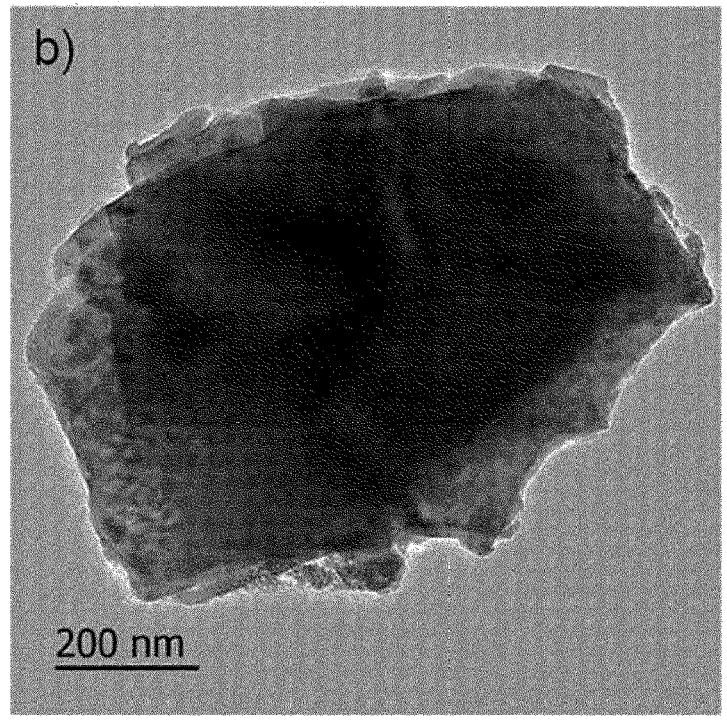
FIG. 3 and FIG. 4 respectively show a result of measuring a transmission electron microscope (TEM) with respect to the $Li_{6-x}CoO_4$ powder prepared in the Example of the present invention, and a result of measuring a selected area diffraction pattern (SADP) with respect to the $Li_{6-x}CoO_4$ powder.

The result of measuring the FESEM and TEM with respect to the $Li_{6-x}CoO_4$ prepared in the Example of the present invention is shown in FIG. 1, FIG. 2, and FIG. 3.

It can be seen from FIG. 1 and FIG. 3 that $Li_{6-x}CoO_4$ particles prepared in the Example of the present invention are irregularly shaped and uneven, and it can also be seen from FIG. 2 showing the distribution chart of the particle sizes that the $Li_{6-x}CoO_4$ particles have an average particle size of 30 μm.

EXPERIMENTAL EXAMPLE

Measurement of TEM and SADP

Figure 4:
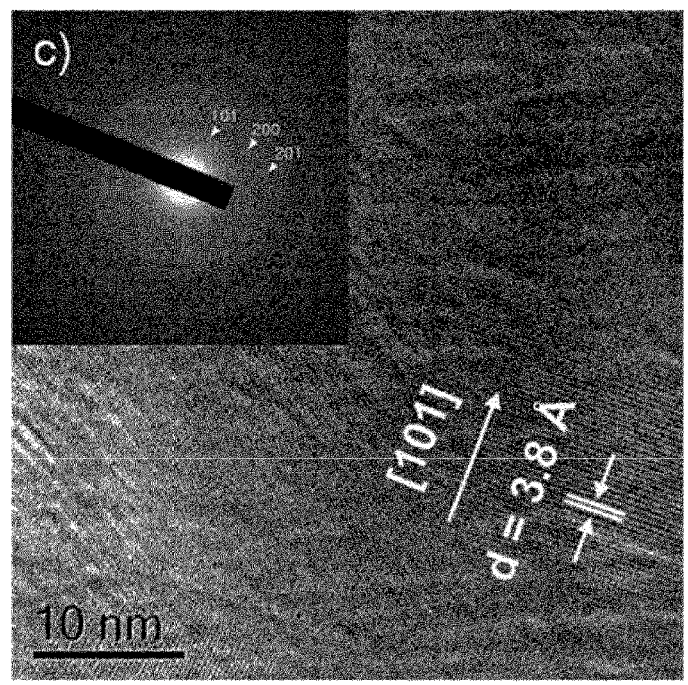

The result of measuring the TEM of $Li_{6-x}CoO_4$ combined with SADP with respect to the $Li_{6-x}CoO_4$ prepared in the Example of the present invention is shown in FIG.4.

It can be seen from FIG. 4 that the d-spacing of the axis was approximately 3.8 Å.

EXPERIMENTAL EXAMPLE

Measurement of XRD

Figure 5:
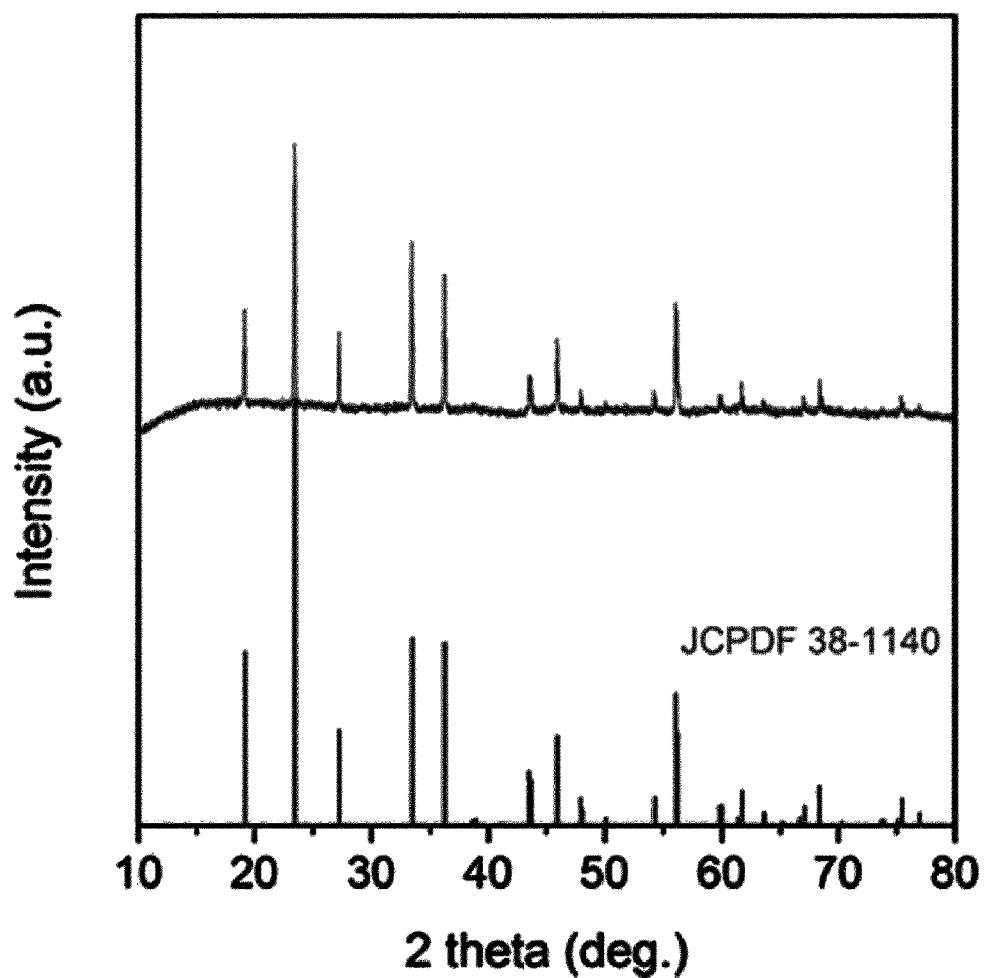
FIG. 5 shows a result of measuring an X-ray diffraction (XRD) with respect to the $Li_{6-x}CoO_4$ powder prepared in the Example of the present invention.

The result of measuring the XRD with respect to the $Li_{6-x}CoO_4$ prepared in the Example of the present invention is shown in FIG. 5.

It can be seen from the XRD measurement result of FIG. 5 that the $Li_{6-x}CoO_4$ particles prepared in Example of the present invention have an anti-fluorite structure in which impurities are not included.

EXPERIMENTAL EXAMPLE

Measurement of inductively coupled plasma (ICP)

The result of measuring the ICP with respect to the $Li_{6-x}CoO_4$ prepared in the Example of the present invention is shown in Table1 below.

It can be seen from Table 1 below that although an x value is initially 0, Li is emitted as an oxidation-reduction reaction is being progressed, and Li is emitted by the x value of 3.77.

TABLE 1

Results of ex-situ ICP analysis for $Li_{6-x}CoO_4$ obtained at various SOC

| SOC (%) | Elements | ppm (mg · kg⁻¹) | Weight (g) | wt % | mol % | Li contents | Extraction value (x) |
|---|---|---|---|---|---|---|---|
| 0 | Li | 180416.6 | 14.77 | 18.04 | 212.81 | 6.10 | 0 |
|   | Co | 250974.1 | 20.55 | 25.10 | 34.87 |   |   |
| 25 | Li | 162890.2 | 13.34 | 16.29 | 192.14 | 5.11 | 0.89 |
|    | Co | 270453.5 | 22.14 | 27.05 | 37.57 |   |   |
| 50 | Li | 158116.3 | 12.95 | 15.81 | 186.51 | 4.16 | 1.84 |
|    | Co | 322679.4 | 26.42 | 32.27 | 44.83 |   |   |
| 75 | Li | 109063.5 |  8.93 | 10.91 | 128.65 | 3.14 | 2.86 |
|    | Co | 295358.4 | 24.18 | 29.54 | 41.03 |   |   |
| 100 | Li | 132516.9 | 10.85 | 13.25 | 156.31 | 2.23 | 3.77 |
|     | Co | 503717.4 | 41.24 | 50.37 | 69.98 |   |   |

MANUFACTURING EXAMPLE

Manufacturing of lithium ion capacitor

Lithium ion capacitor with the same structure as in FIG. 6 were manufactured. The lithium ion capacitors were manufactured using two types of Li pre-doping amounts of 60% and 100%.

In the case of 60% pre-doping, 80.9 wt% of activated carbon as a cathode active material, 11.1 wt% of $Li_{6-x}CoO_4$ particles for 60% doping, 10 wt% of polyvinylidene fluoride (PVdF) as a binder, and N-methylpyrrolidone (NMP) as a solvent were mixed to prepare a slurry.

After coating the slurry on an aluminum (Al) foil with a thickness of 20 μm and drying the slurry applied to the Al foil, a cathode as a disc with a diameter of 12 mm was manufactured by compacting using a press and drying at 120° C. under vacuum conditions for 16 hours.

In the case of 100% pre-doping, a slurry was prepared by mixing the activated carbon as the cathode active material, 17.2 wt% of $Li_{6-x}CoO_4$ particles, 10 wt% of PVdF as a binder and NMP as a solvent, and a cathode was manufactured by coating the slurry on the Al foil in the same method as described above.

TABLE 2

| Specification | LIC-conventional PE (mg) | LIC-conventional NE (mg) | LIC-$Li_6CoO_4$ 60% doping PE (mg) | LIC-$Li_6CoO_4$ 60% doping NE (mg) | LIC-$Li_6CoO_4$ 100% doping PE (mg) | LIC-$Li_6CoO_4$ 100% doping NE (mg) |
|---|---|---|---|---|---|---|
| Active material | 5.805 | 3.360 | 5.805 | 3.360 | 5.805 | 3.360 |
| LCO | 0 | 0 | 0.800 | 0 | 1.335 | 0 |
| Super-P | 0 | 0.420 | 0 | 0.420 | 0 | 0.420 |
| PVdF | 0.505 | 0.420 | 0.574 | 0.420 | 0.621 | 0.420 |
| Current collector | 5.893 | 27.42 | 5.893 | 27.42 | 5.893 | 27.42 |
| Separator | 4.354 | | 4.354 | | 4.354 | |
| Total (mg) | 48.174 | | 49.043 | | 49.628 | |

In the case of an anode, a slurry was prepared by mixing 80 wt % of hard carbon and $Li_{6-x}CoO_4$ as an anode active material, 10 wt % of super-P as a conductive agent, and 10 wt % of PVdF as a binder, and the anode was manufactured by coating the slurry on a copper foil.

The amount of $Li_{6-x}CoO_4$ is based on the corresponding a anode capacity (0.404 mAh in the case of 60% and 0.673 mAh in the case of 100% doping)

TABLE 3

| Specification | | LIC-Conventional | LIC-$Li_6CoO_4$ 60% doping | LIC-$Li_6CoO_4$ 100% doping |
|---|---|---|---|---|
| Thickness (cm) | PE | 0.01116 | 0.01270 | 0.01370 |
|  | NE | 0.003 | 0.003 | 0.003 |
|  | Metallic Li | 0.026 (1 ea) | 0 | 0 |
|  | Separator | 0.0028 (2 ea) | 0.0014 (1 ea) | 0.0014 (1 ea) |
|  | Total | 0.04286 | 0.0171 | 0.0181 |
| Area (cm²) | | 5.76 | 2.25 | 2.25 |
| Volume (cm³) | | 0.2469 | 0.0385 | 0.0407 |

1 M $LiPF_6$ dissolved in ethylene glycol (EC)/dimethyl chloride (DMC) at a ratio of 3:7 was used as a electrolyte.

A capacitor was manufactured by the same method as in the above-mentioned Manufacturing Example except that the $Li_{6-x}CoO_4$ particles as an additive were not included as Comparative Example.

Experimental Example

Evaluation of Charge and Discharge Characteristics

Figure 7:
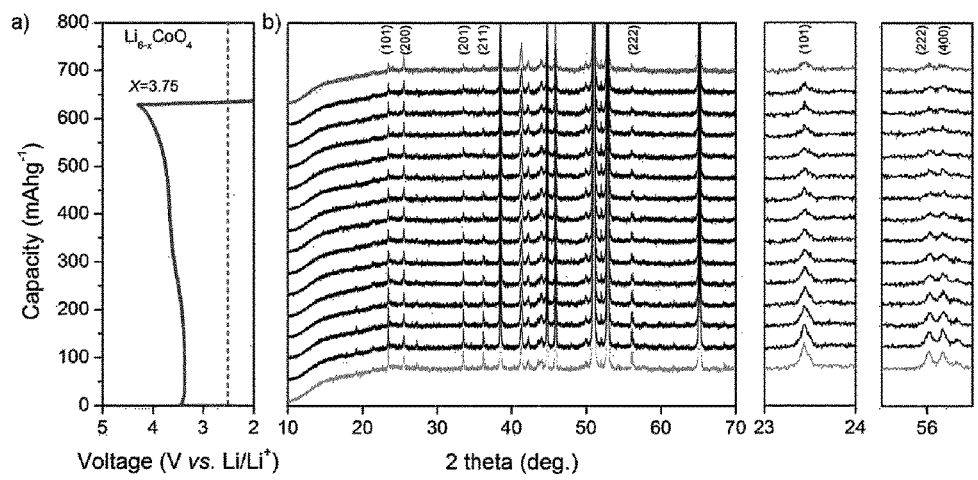

After initial galvanostatic charge and discharge characteristics for a capacitor comprising the $Li_{6-x}CoO_4$ prepared in the Manufacturing Example were measured while changing a cut-off voltage from 2.0 V to 4.3 V, the measurement result is shown in FIG. 7, and a result of measuring an in situ XRD according to a charging and discharging process is also shown in FIG. 7.

In the result of measuring the initial galvanostatic charge and discharge characteristics of FIG. 7, Li ions can be extracted with two plateau regions at 3.5 and 3.8V during the initial charging, Li ion is not reversibly inserted at initial discharge. As a result, an initial efficiency of 1.14% was attained. The charge capacity responsible for Li ions extraction was estimated to be 630.2 mAh/g$^{-1}$ (about 3.75 mol of Li ions extraction) and only 7.2 mAh/g$^{-1}$ for Li ions insertion.

In the charging and discharging process From the in situ XRD, along with Li ions extraction, (101), (222), and (400) peaks become broad without peak shift. It can be confirmed that the extracted Li ion could not be inserted into again.

Experimental Example

Evaluation of XPS Characteristics

Figure 8:
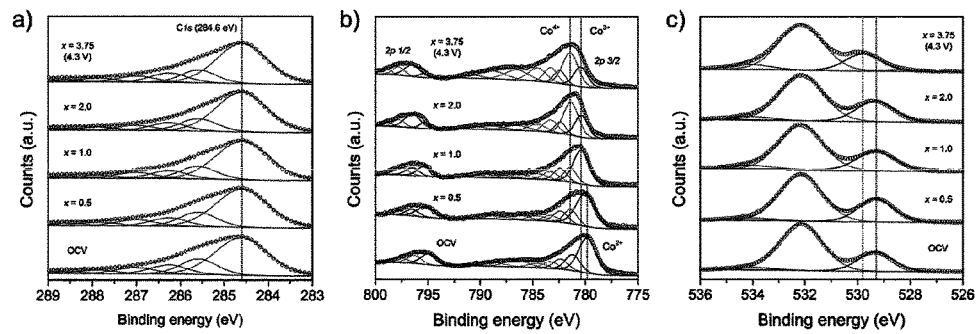

XPS characteristics for a capacitor comprising the $Li_{6-x}CoO_4$ particles prepared in Example of the present invention were measured, and the measurement result is shown in FIG. 8.

FIG. 8 is XPS spectra of (a) C 1s, (b) Co 2p, and (c) O 1s.

It can be seen that an oxidation-reduction reaction of $Co^{2+}/Co^{3+}$ causes Li ions to be emitted since a 780.4 eV peak corresponding to $Co^{3+}$ appears when x is 1 in $Li_{6-x}CoO_4$ while the Li ions are being inserted or emitted although a peak at 779.8 eV represents the highest strength due to $Co^{2+}$ ions before the Li ions are inserted or emitted.

It can be confirmed that $Co^{+4}$ is not further oxidized when x is 3.75 or more although an oxidation-reduction reaction of $Co^{3+}/Co^{4+}$ causes Li ions to be emitted thereafter since a peak of $Co^{3+}$ is decreased, a peak strength of $Co^{4+}$ observed at 781.4 eV is increased while Li ions are continuously being emitted until x becomes 2.0.

Figure 9:
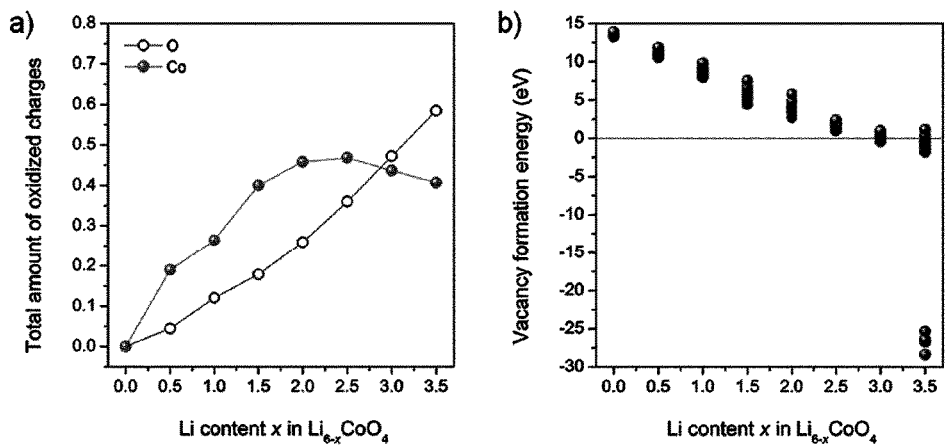

A result of measuring an oxidized charge quantity according to an x value is shown in FIG. 9. As shown in FIG. 9, $Co^{+4}$ is not further oxidized into $Co^{+5}$ when x is 3.75 or more, and the oxidized charge quantity denotes a negative value of vacancy formation energy when x is 3.5 or more. Therefore, it can be seen that a structural defect is exhibited when x is 3.5 or more although the Li ions are emitted according to changes in oxidation number without structural degradation when x is 3.5 or lower.

Experimental Example

Measurement of Behaviors According to Changes in Cut-Off Voltages

Figure 10:
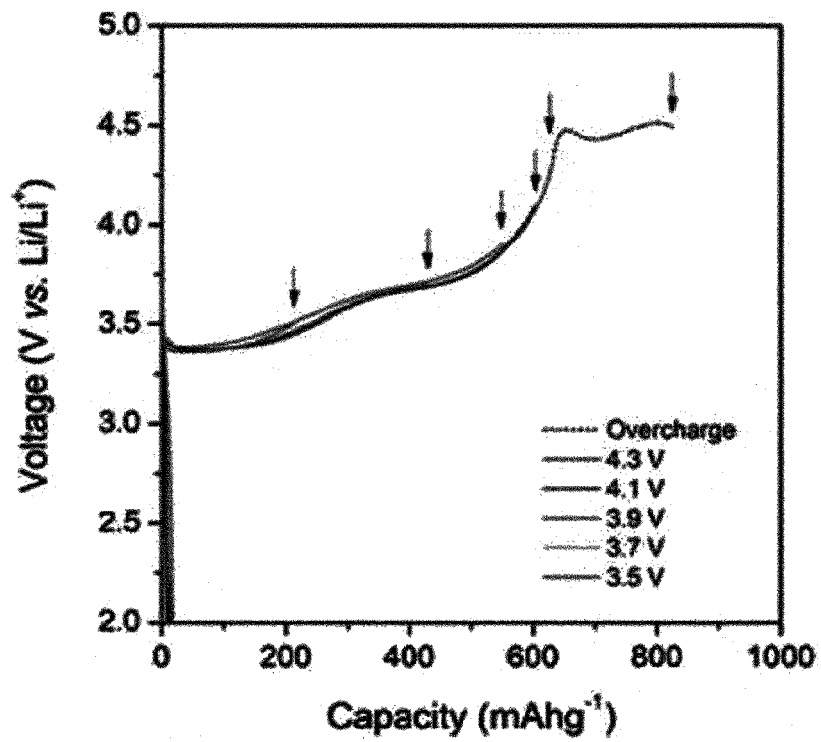
FIG. 10 shows a result of measuring behaviors depending on cut-off voltage change with respect to the capacitor manufactured in the Example of the present invention.

It can be confirmed that a charge/discharge profile is exhibited in an abnormal shape when the capacitor is cut-off at a voltage of 4.5 V even in FIG. 10 showing the case that the capacitor is overcharged by changing cutoff voltages.

Experimental Example

Evaluation of Pre-Doping Characteristics

Figure 11:
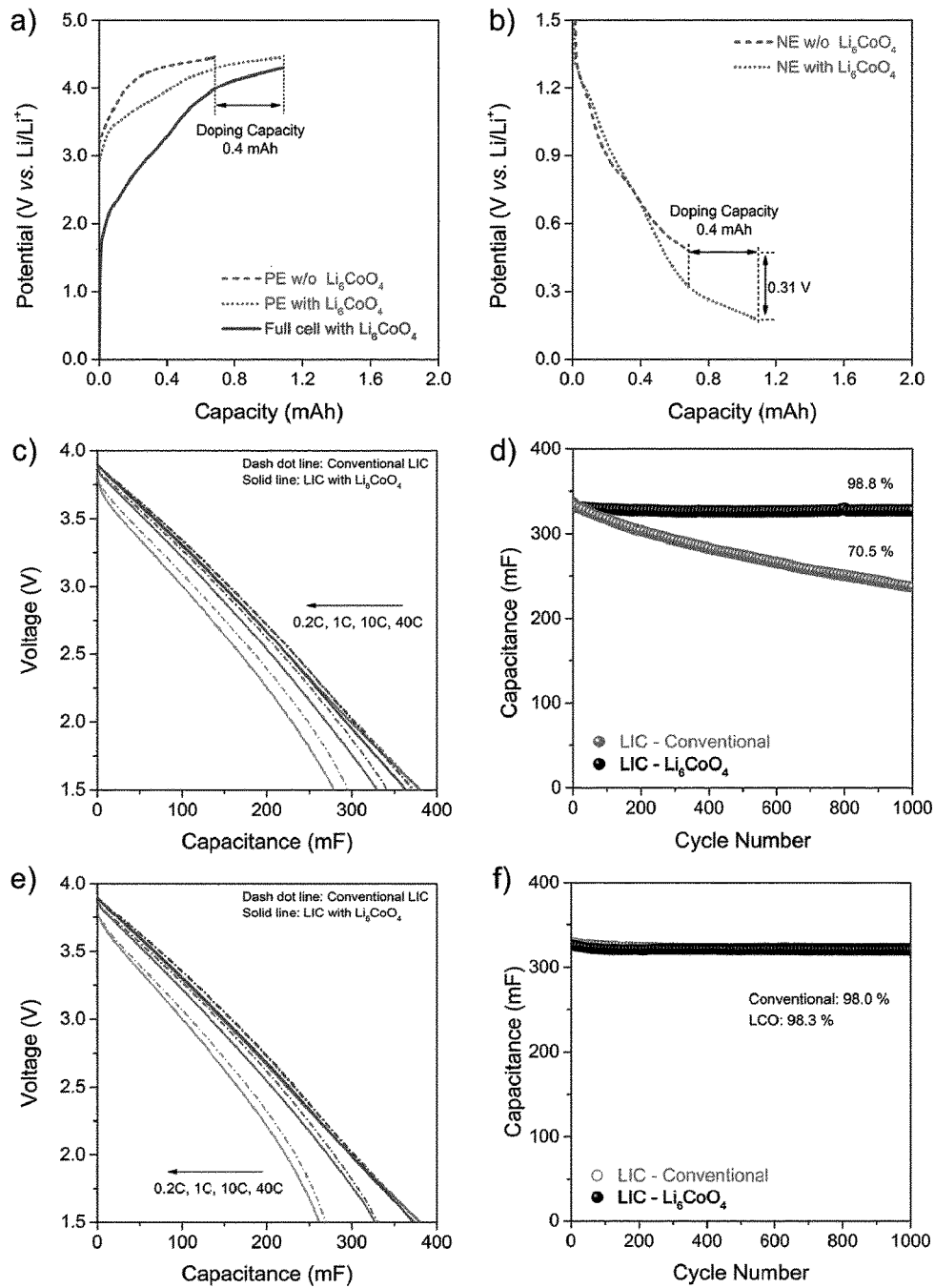
FIG. 11 shows results of measuring pre-doping characteristics and charge and discharge characteristics after pre-doping with respect to the capacitor manufactured in the Example of the present invention.

Initial pre-doping characteristics were measured in the case of Example which comprises $Li_{6-x}CoO_4$ according to the present invention and in the case of Comparative Example which does not comprise $Li_{6-x}CoO_4$, and the measured results are shown in a) and b) of FIG. 11.

It can be seen from a) and b) of FIG. 11 that, in the case of Example which comprises $Li_{6-x}CoO_4$ according to the present invention, capacity of the cathode is increased as much as 0.404 mAh by pre-doping of Li, and voltage of the anode is lowered as much as 0.31 V since extracted Li ions were delivered into anode.

Experimental Example

Evaluation of Charge and Discharge Characteristics

After performing initial pre-doping process, charge and discharge characteristics were measured in the case of Example which comprises $Li_{6-x}CoO_4$ according to the present invention and in the case of Comparative Example which does not comprise $Li_{6-x}CoO_4$ according to the present invention, and the measured results are shown in c) to f) of FIG. 11.

It can be confirmed that charge and discharge characteristics and lifetime characteristics are greatly improved in the case of Example which comprises $Li_{6-x}CoO_4$ according to the present invention.

As described above, a lithium ion capacitor comprising a lithium ion capacitor additive according to the present invention can electrochemically dope the anode with lithium even without performing a pre-doping process using lithium metal as in the conventional lithium ion capacitor. Therefore, it is possible to additionally secure safety of the lithium ion capacitor and improve energy density of the lithium ion capacitor through improvement of the lithium doping process. Further, a safety problem of workers can also be solved by removing ignition possibility of highly flammable lithium ions in an existing doping process using lithium metal.

Accordingly, the present invention is expected to greatly contribute to the creation of a new market simultaneously requiring high power and high energy characteristics as well as an existing market of lithium ion batteries. In particular, the present invention can be applied to application fields for compensating an instant voltage drop of a ubiquitous power supply or new renewable energy and improving efficiency of the ubiquitous power supply or new renewable energy. Further, the present invention can also be applied to various fields including key components of an electric vehicle or an electric rail car.

The lithium ion capacitor additive according to the present invention is capable of emitting 3 mols or more of lithium ions even at a low voltage of 4.4 V or less, and the lithium ion capacitor including the lithium ion capacitor additive according to the present invention is capable of electrochemically doping lithium onto the anode even without performing a pre-doping process using lithium metal as in a conventional lithium ion capacitor.

What is claimed is:

1. A cathode active material for a lithium ion capacitor, the cathode active material comprising a lithium ion capacitor additive represented by $Li_{6-x}Co_yM1_{1-y}O_{4-z}A_z$ wherein 0≤x≤4, 0≤y≤1 and 0≤z≤1, M1 is any one selected from the group consisting of Ni, Mn and Fe, and A is any one selected from the group consisting of F, Cl and Br, and a carbon-based material, wherein the lithium ion capacitor additive in the cathode active material is characterized in that the energy at which a peak intensity caused by a cobalt (Co) atom in XPS exhibits a maximum at 779.8 eV by $Co^{2+}$ when x is 0, exhibits a maximum at 780.4 eV by $Co^{3+}$ when x is more than 0 and less than 1, and exhibits a maximum at 781.4 eV by Co4+ when x is more than 1 and less than 2.

2. The cathode active material for the lithium ion capacitor of claim 1, wherein the lithium ion capacitor additive in the cathode active material is characterized in that although there is not a change in the location of energy at which a peak intensity caused by an oxygen (O) atom in the XPS becomes a maximum according as x increases when x is 2 or less, the location of energy at which a peak intensity caused by an oxygen (O) atom in the XPS becomes the maximum according as x increases is moved from 529.3 eV to 529.8 eV when x is 2 or more.

3. The cathode active material for the lithium ion capacitor of claim 1, wherein the cathode active material has an initial charge-discharge efficiency (QE) according to the following calculation formula 1 of 50% or less:

$QE=(QD/QC) \times 100$, wherein

QE denotes an initial charge-discharge efficiency of lithium composite metal oxide, QD denotes a discharge capacity (mAh/g) with a cut-off discharge voltage of 2.3V vs. Li/Li+

QC denotes a charge capacity (mAh/g) with a cut-off charge voltage of 4.7V vs. Li/Li+.

4. The cathode active material for the lithium ion capacitor of claim 1, wherein the carbon-based material is one or more selected from the group consisting of activated carbon, an activated carbon-metal oxide composite, and an activated carbon-conductive polymer composite.

5. The cathode active material for the lithium ion capacitor of claim 1, wherein the lithium ion capacitor additive is mixed at a ratio of 10 to 20 parts by weight with the respect to 100 parts by weight of the carbon-based material.

6. A lithium ion capacitor comprising:

a cathode including the cathode active material according to claim 1;

an anode including an anode active material; and a separator between the cathode and the anode, wherein the anode receives lithium ions only from the cathode.

7. The lithium ion capacitor of claim 6, wherein the anode is pre-doped with lithium in an amount corresponding to 60 to 100% of anode capacity.

* * * * *

UNITED STATES PATENT AND TRADEMARK OFFICE
CERTIFICATE OF CORRECTION

PATENT NO.         : 10,522,301 B2
APPLICATION NO.    : 15/740895
DATED              : December 31, 2019
INVENTOR(S)        : Jun Ho Song, Young Jun Kim and Min Sik Park It is certified that error appears in the above-identified patent and that said Letters Patent is hereby corrected as shown below:

On the Title Page

At item (73), the Assignee country code shown as (KP) should be corrected to show as (KR).

Signed and Sealed this
Third Day of March, 2020

Andrei Iancu
*Director of the United States Patent and Trademark Office*